United States Patent Office 3,754,013
Patented Aug. 21, 1973

3,754,013
ARSENIC CONTAINING ENAMINES AND
AMIDINIUM SALTS
Harold I. Weingarten, St. Louis, Mo., assignor to
Monsanto Company, St. Louis, Mo.
No Drawing. Filed Dec. 20, 1971, Ser. No. 210,236
Int. Cl. C07f 9/66
U.S. Cl. 260—440      3 Claims

ABSTRACT OF THE DISCLOSURE

The invention relates to arsenic containing enamines and amidinium salts prepared by reacting enamines with metal halides. The products are useful as a source of functionalized organic arsenic compounds suitable for incorporation into nylon spinning mixtures to impart resistance to fungi and bacteria.

---

The present invention relates to new arsenic containing compounds and to the process for their preparation.

It is an object of this invention to prepare certain arsenic containing enamines and amidinium salts by reacting enamines with arsenic compounds.

The compositions of the present invention have a formula selected from the group consisting of

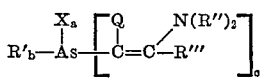

and

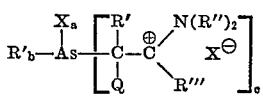

where $a = 3-(b+c)$ or $4-(b+c)$, $b=0, 1, 2,$ or $3$, $c=1, 2,$ or $3$;
$R'$ = hydrogen, alkyl, or aryl;
—$N(R'')_2$ = —$NME_2$, —$NEt_2$, pyrrolidinyl, piperidino, morpholino, —$N(aryl)_2$;
$R''' = R'$, —$N(R'')_2$;
$X = F, Cl, Br, I$;

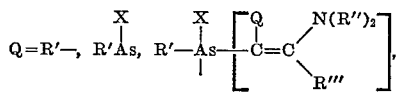

and

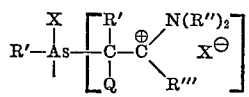

The general process of the present invention for the preparation of the above organometallic enamine and amidinium salts is the admixing of an organic enamine together with an arsenic halide.

The organic enamines used in the synthesis

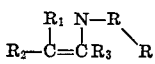

have the following structural features: $R_1$, $R_2$ and $R_3$ are hydrogen, hydrocarbon radicals of 1 to 10 carbons or aryl radicals of 6 to 20 carbons; $R_3$ may also be an —$N(R)_2$ group where R is a hydrocarbon radical of 1 to 5 carbons; $R_1$ and $R_2$, or $R_2$ and $R_3$ may be joined in a ring such as:

The arsenic compounds are chosen from the list including: halides, e.g. Cl, Br, or I, or pseudo halides such as —CN, —SCN and —$N_3$.

A solvent is not essential but may be desirable; typical solvents include benzene, ether, acetonitrile, chloroform, dioxane. The pressure and temperature of the reaction are not critical, most of the reactions readily occur at room temperature, although a preferred range is from —10° C. to 100° C. The proportions of the reactants may be varied widely, although the reactive proportions are substantially stoichiometric. The reaction is preferably conducted in an inert atmosphere substantially free of oxygen and water vapor.

The compounds of the present invention are useful as a source of functionalized organic arsenic compounds, for example:

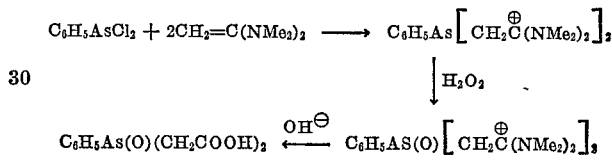

Such difunctional compounds can be incorporated into a nylon polymer, for example by incorporation into the spinning mixture before the spinning or extrusion step, to impart resistance to fungi and bacteria.

The following examples are illustrative of the invention, but are not limitative of the scope thereof.

EXAMPLE 1

Preparation of 2,2-phenylarsylenebis[1,1-bis(dimethylamino)ethylium] dichloride. To a solution of phenyldichloroarsine (0.01 mole) in 10 ml. acetonitrile is slowly added 0.02 mole vinylidenebisdimethylamine. Heat is evolved and NMR analysis shows that the starting material reacts, and that product peaks are visible. The addition of ether to the reaction solution causes the product 2,2 - phenylarsylenebis[1,1 - bis(dimethylamino)ethylium] dichloride,

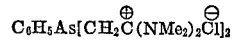

to precipitate as colorless crystals.

EXAMPLE 2

Preparation of 1,1-bis(dimehtylamino)-2,2-dimethyl-2-dichloroarsino)ethylium chloride. To a solution of 1.8 g. (0.01 mole) arsenic trichloride in 10 ml. chloroform is slowly added 1.42 g. (0.01 mole) 2-methylpropenylidenebisdimethylamine. Heat is evolved and NMR analysis shows that the starting material is reacted, and that product peaks are visible. The addition of ether to the reaction solution causes the product, 1,1-bis(dimethylamino) - 2,2 - dimethyl - 2 - (dichloroarsino)ethylium chloride,

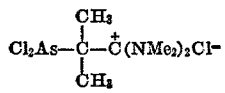

to precipitate as colorles crystals.

What is claimed is:

1. 2,2 - phenylarsylenebis[1,1 - bis(dimethylamino) ethylium] dichloride.

2. Process for the preparation of 2,2-phenylarsylenebis[1,1 - bis(dimethylamino)ethylium] dichloride by admixing phenyldichloroarsine with vinylidenebis(dimethylamine).

3. Process for the preparation of 1,1-bis(dimethylamino) - 2,2 - dimethyl - 2 - (dichloroarsino)ethylium chloride by admixing arsenic trichloride together with 2-methylpropenylidenebisdimethylamine.

References Cited
UNITED STATES PATENTS 3,010,983   11/1961   Ramsden _____ 260—440

WERTEN F. W. BELLAMY, Primary Examiner

U.S. Cl. X.R.

424—297